United States Patent [19]
Tozzoli et al.

[11] Patent Number: 6,151,588
[45] Date of Patent: Nov. 21, 2000

[54] FULL SERVICE TRADE SYSTEM

[75] Inventors: Guy Frederick Tozzoli, Westwood, N.J.; Christopher James Lynch, Brooklyn, N.Y.

[73] Assignee: Tradecard, Inc., Del.

[21] Appl. No.: 09/020,740

[22] Filed: Feb. 9, 1998

Related U.S. Application Data

[62] Division of application No. 08/323,071, Oct. 13, 1994, Pat. No. 5,717,989.

[51] Int. Cl.[7] ........................................ G06F 17/60
[52] U.S. Cl. .......................... 705/37; 705/35; 705/39
[58] Field of Search .......................... 705/35, 4, 1, 37, 705/26, 39, 40, 42

[56] References Cited

U.S. PATENT DOCUMENTS

| | | | |
|---|---|---|---|
| 3,573,747 | 4/1971 | Adams | 705/37 |
| 4,017,101 | 4/1977 | Case | 283/57 |
| 4,270,042 | 5/1981 | Case | 235/379 |
| 4,903,201 | 2/1990 | Wagner | 705/37 |
| 4,947,028 | 8/1990 | Gorog | 235/380 |
| 5,694,551 | 12/1997 | Doyle et al. | 705/26 |

*Primary Examiner*—Emanuel Todd Voeltz
*Assistant Examiner*—George D. Morgan
*Attorney, Agent, or Firm*—George B. Snyder; Whitman Breed Abbott & Morgan LLP

[57] ABSTRACT

A system stores criteria specified by a funder relating to trade transactions for buyers and sellers. The system compares the criteria with a proposed purchase order to determine whether the system can generate a payment guarantee on behalf of the funder for the buyer to the seller. The system also compares subsequent documents relating to an original purchase order with the original purchase order to ensure that the terms of the purchase order are properly fulfilled. When the appropriate conditions for payment are met, the system issues a funds transfer instruction to transfer payment from the buyer to the seller.

8 Claims, 8 Drawing Sheets

FULL SERVICE TRADE SYSTEM

This application is a division of application Ser. No. 08/323,071, now U.S. Pat. No. 5,717,989, filed Oct. 13, 1994, which is incorporated herein by reference.

BACKGROUND OF THE INVENTION

The present invention relates to a computer system that facilitates trade in goods and services.

In international sales of goods, the buyer and seller may not know each other, or may not be familiar with the other's legal system. Thus, one of the major difficulties in international trade is to assure payment, particularly when the buyer or the seller is a small or medium sized business which expects difficulties in obtaining payment should a problem arise. Conventionally, a letter of credit is used in international trade to shift transaction risks to parties better able to manage these risks, specifically, to shift payment risks from unknown entities, such as a distant buyer, to known entities, such as a local bank.

A letter of credit (L/C) is usually an irrevocable undertaking by a bank to pay the beneficiary of the letter, for example, a seller of goods, specified sums of money when certain conditions are fulfilled, to be charged to the account of the person, for example, the buyer of the goods, who causes the bank to issue the letter of credit.

Generally, after a buyer and seller have made an agreement for the sale of goods, the buyer instructs its bank to open an L/C in favor of the seller. The buyer's bank advises the seller's bank that an L/C has been opened in favor of the seller, and the seller's bank accepts the buyer's bank's guarantee to pay. The seller's bank advises the seller that an L/C has been opened in its favor, and the conditions which must be fulfilled for payment to occur. Usually, the seller's bank makes an irrevocable promise to pay the seller upon presentation of appropriate documents. The L/C document is considered an asset of the seller, and can be sold or assigned by the seller.

Documentation which the seller usually must present to obtain payment includes a bill of lading from its shipper, an invoice identifying the purchase, an appropriate insurance certificate, a certificate of inspection from an inspection firm confirming that the required goods are being shipped, export licenses and/or health inspection certificates, and certificates of origin used by customs personnel. After the correct documents are presented, the seller's bank pays the seller, then collects payment from the buyer's bank and delivers the presented documents to the buyer's bank. In turn, the buyer's bank obtains payment from the buyer.

Meanwhile, the shipper, via a carrier, transports the goods to the buyer's location. The carrier requires presentation of the bill of lading, which was delivered to the seller, before transferring possession of the goods to the buyer.

The buyer obtains the bill of lading from its bank after payment, and then the buyer and its broker arrange for presentation of the bill of lading to the carrier and delivery of the goods to the buyer's location. Often, the carrier delivers the goods to the buyer's broker at the customs entry point of the buyer's country.

Figure 1:
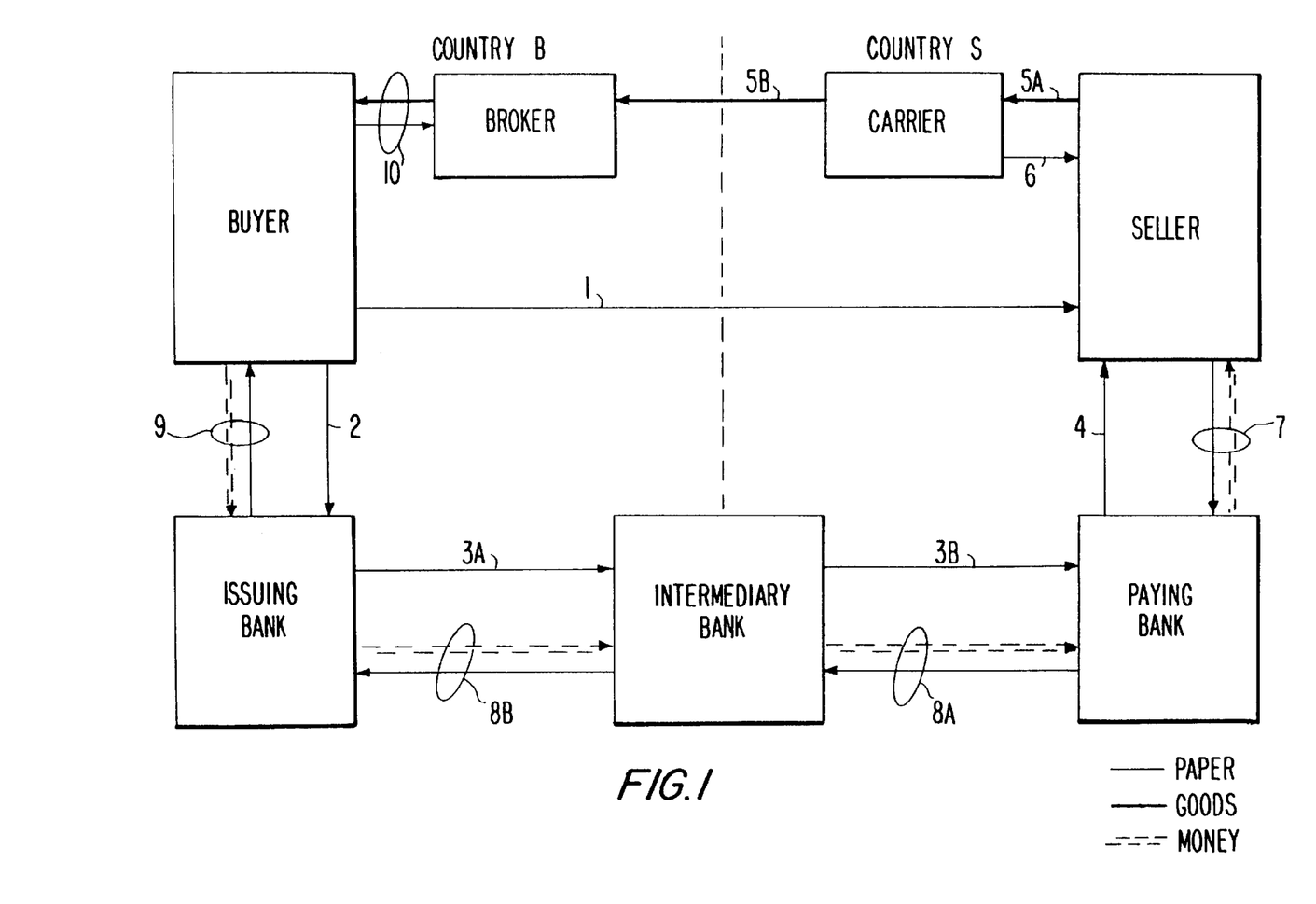
FIG. 1 is a block diagram of flows in an international trade using a conventional letter of credit.

Referring now to FIG. 1, there is illustrated a block flow diagram for an international trade using a conventional letter of credit. The buyer and seller are assumed to be located in countries B and S, respectively. The issuing bank is a bank in country B which has agreed with the buyer to issue a letter of credit in favor of the seller. The paying bank is a bank in country S known to the seller which has guaranteed the letter of credit to the seller. The intermediary bank, which may be in country B, country S or a third country, is a bank trusted by both the issuing bank and the paying bank.

To begin, the buyer issues a purchase order based on an agreement previously concluded between the buyer and the seller (arrow 1). Then, the buyer approaches its chosen issuing bank and instructs the issuing bank to open a letter of credit in favor of the seller confirmed on its chosen paying bank (arrow 2). The letter of credit may be confirmed, unconfirmed or standby. In a standby letter of credit, if the transaction proceeds properly, the standby L/C expires, but if the transaction does not proceed properly, the damaged party draws on the standby L/C.

The issuing bank is assumed in this example to have no direct relationship with the paying bank, so the issuing bank approaches an intermediary bank which accepts the guarantee to pay of the issuing bank (arrow 3A). The intermediary bank then approaches the paying bank, which accepts the guarantee to pay of the intermediary bank (arrow 3B).

The paying bank then advises the seller that an L/C has been opened in its favor and that upon presentation of appropriate confirming documentation, including the Bill of Lading from a Shipper, the paying bank will pay the seller (arrow 4). In this scenario, that is, assuming a confirmed L/C, the paying bank must pay without recourse upon presentation of appropriate documentation. In other cases, the paying bank has recourse, that is, the paying bank passes the documentation to the issuing bank and obtains payment therefrom before paying the seller.

The seller finishes producing the goods and arranges for shipment with a shipper. Goods are passed to the shipper (arrow 5A). The shipper transports the goods to a port of entry in the buyer's country (arrow 5B).

Upon receipt of goods, the shipper provides the seller with a bill of lading (arrow 6). The seller presents the bill of lading and other confirming documentation to its paying bank in order to collect against the L/C (arrow 7). After verifying that the documentation is in order, the paying bank pays the seller (arrow 7).

The paying bank presents the documentation and its proof of payment to the intermediary bank (arrow 8A), which pays the paying bank. The intermediary bank in turn presents the documentation and its proof of payment to the issuing bank (arrow 8B), which pays the intermediary bank. The issuing bank then obtains payment from the buyer and gives the buyer the confirming documentation including the bill of lading (arrow 9).

The buyer gives its agent, such as a broker, the bill of lading and other necessary documentation. The buyer's agent obtains the goods from the shipper, clears the goods through customs in country B and arranges for delivery of the goods to the buyer (arrow 10). The international trade is now completed.

An L/C shields the seller from the risk of non-payment by the buyer and reduces the risk to the buyer that the buyer will pay for goods not received. With the L/C, the risk of non-payment is assumed substantially by the buyer's bank, which is assumed to be able to evaluate the risk of non-payment by the buyer. The seller's bank assumes the risk of non-payment by the buyer's bank, which the seller's bank is assumed to be able to evaluate. The banks require fees to compensate them for their risks and the expenses they incur in connection with the L/C. Typically the buyer's bank also requires that the buyer pledge collateral such as cash or marketable securities against the L/C or otherwise reduces its exposure in the event of non-payment by the buyer. These bank fees and requirements are a burden on trade, particularly on the buyer. Also, the delay involved in establishing an L/C for each transaction is a burden on trade.

Problems multiply because the L/C mechanism separates the transaction into substantially independent contracts, namely, the contract for the sale of goods from buyer to seller, the bill of lading, and the letter of credit.

One fertile source of difficulties for the seller is that its bank usually requires that all the documents called for in the L/C exactly correspond with the terms of the L/C, and withholds payment to the seller even due to typographical errors and minor misspellings. This has caused an enormous amount of frustration to sellers seeking payment.

Another problem is that the L/C holder can obtain payment with the correct documents, even if shipment has not actually occurred.

Yet another problem is that the L/C document itself has value, so there are expenses associated with its custody and in assuring that it is genuine.

A bank incurs roughly the same expenses in connection with an L/C, independent of the value of the goods to which the L/C pertains. The bank's fee is sometimes expressed as a percentage of the amount of the L/C, such as 1%. Assuming, for example, that the bank's expenses are $10,000, it will be appreciated that the bank is reluctant to open an L/C for transactions involving less than $1,000,000 of goods, as this business is not profitable for the bank. Thus, it is difficult for parties wishing to participate in international trade to use the L/C mechanism when the value of the goods involved in a transaction is small enough that the expense of an L/C becomes significant.

OBJECTS AND SUMMARY OF THE INVENTION

Therefore, an object of the present invention is to provide a computer system for trade transactions in goods and/or services which avoids the aforementioned disadvantages of the prior art.

Another object of the present invention is to reduce the expenses and delays associated with financing trade.

A further object of the present invention is to provide a computer system for facilitating trade when the value of the goods or services involved is relatively small.

Yet another object of the present invention is to reduce the possibility of errors in documents pertaining to trade transactions.

A still further object of the present invention is to reduce the expenses associated with document custody for trade transactions.

In accordance with an aspect of this invention, a method of facilitating trade using a data processing system as well as a system and a digital computer for facilitating trade serve to store purchase order data representing a contract between a buyer and a seller, input subsequent action data about a subsequent action in fulfillment of the contract, and determine whether the subsequent action data satisfies the contract based on the purchase order data.

In accordance with another aspect of this invention, a method of facilitating trade using a data processing system as well as a system and a digital computer for facilitating trade serve to store purchase order data representing a contract between a buyer and a seller, input a request to prepare a data entry template for entering subsequent action data relating to a subsequent action in performance of the contract represented by the stored, purchase order data, prepare the data entry template based on the purchase order data, output the prepared data entry template for entry of the subsequent action data, enter the subsequent action data using the prepared data entry template, and determine whether the entered subsequent action data satisfies the contract based on the purchase order data.

In accordance with a further aspect of this invention, a method of facilitating trade using a data processing system as well as a system and a digital computer for facilitating trade serve to store first criteria data for respective trading qualifications of a buyer and a seller, input proposed purchase order data representing a proposed purchase contract for goods or services between the buyer and the seller, and determine whether the proposed purchase order data satisfies the stored first criteria data for respective trading qualifications for the buyer and for the seller.

In accordance with a yet further aspect of this invention, a method of facilitating trade using a data processing system as well as a system and a digital computer for facilitating trade serve to store offer data representing an offer to trade goods or services including overt and hidden terms, transmit overt terms data representing the overt terms of the offer to trade to at least one party, input response data representing a response from the at least one party to the transmitted overt terms data, and compare the response data with the offer data to produce term compliance data indicating whether the response data are in compliance with the overt and hidden terms of the offer.

The above, and other objects, features and advantages of the present invention will be apparent in the following detailed description of the preferred embodiments of the present invention when read in conjunction with the accompanying drawings in which corresponding parts are identified by the same reference symbol.

DETAILED DESCRIPTION OF CERTAIN ADVANTAGEOUS EMBODIMENTS

Figure 4:
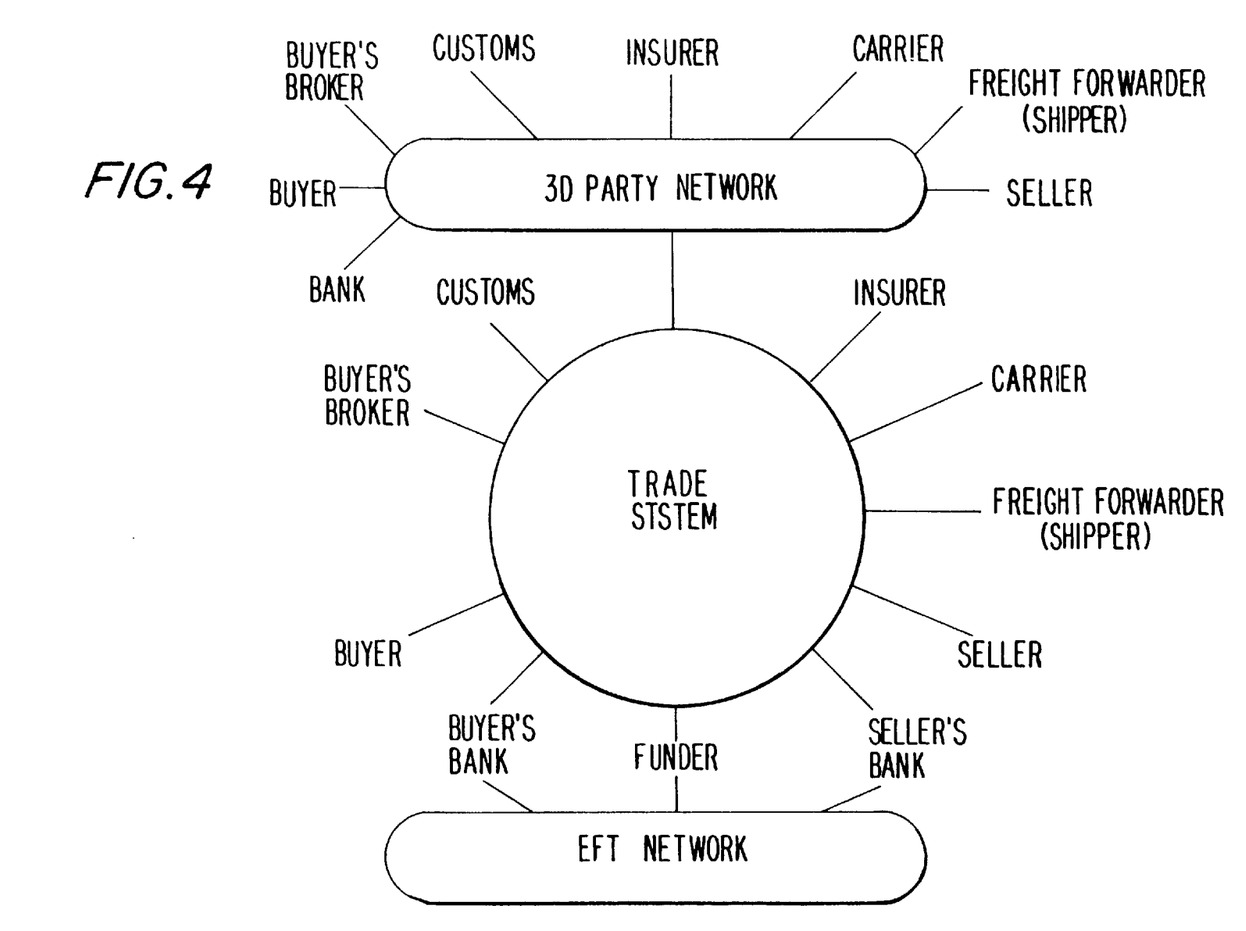
FIG. 4 is a block diagram illustrating an embodiment of a trade system in accordance with the present invention.
Figure 5:
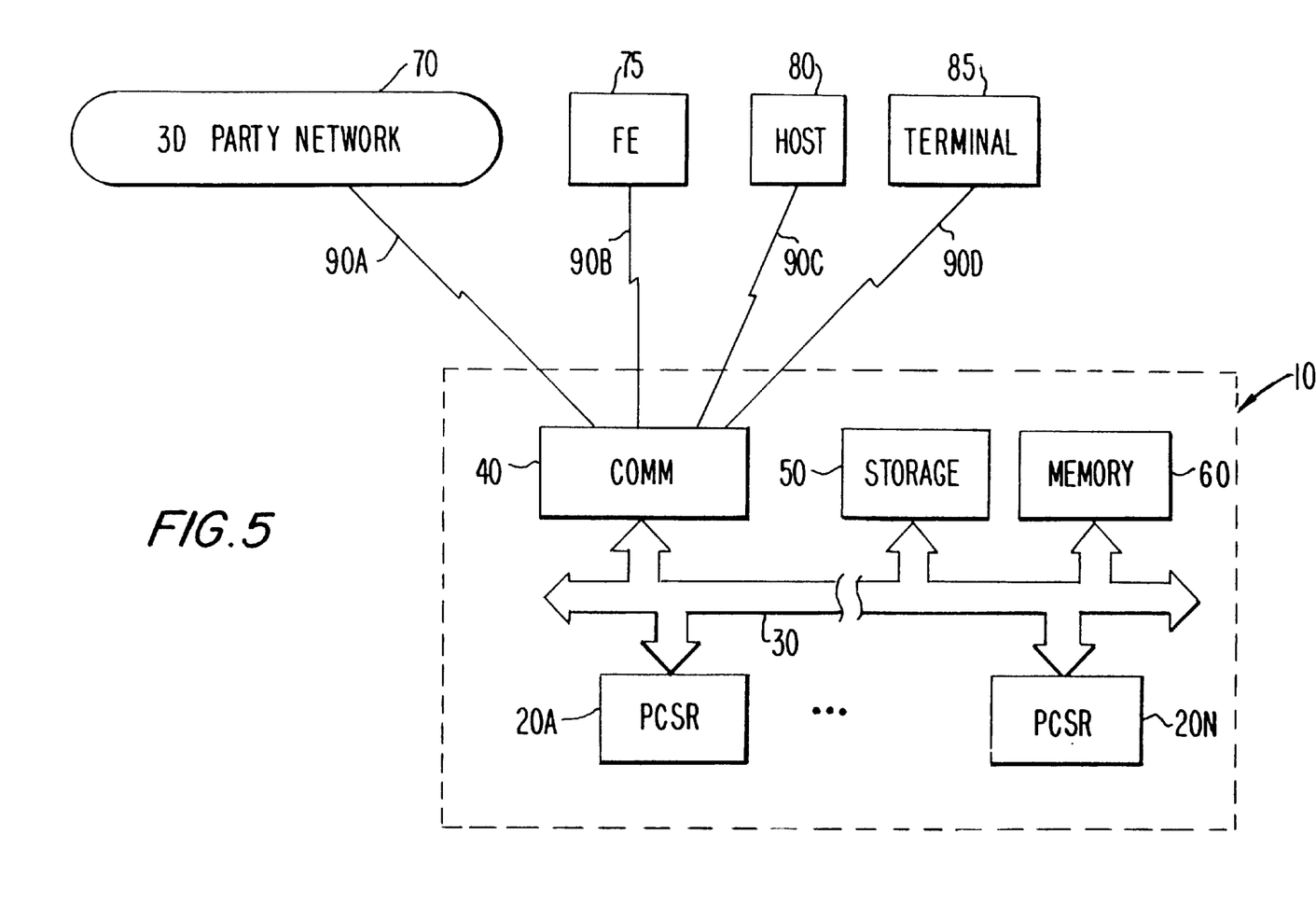
FIG. 5 is a block diagram further illustrating the trade system of FIG. 4.

The present invention includes a computer system which facilitates trade in goods and services. The trade system receives inputs from and supplies outputs to buyers, sellers, funders and the various parties involved in a trade transaction, such as shippers, carriers, insurers, banks and the like, as shown in FIGS. 4 and 5. The trade system shown in FIG. 4 comprises a central computing facility, telecommunications circuits and front end software and hardware located at user premises. The users of the trade system communicate with the system using their own or third party conventional telecommunications equipment. The users may also communicate with each other through other non-system avenues, such as third party networks.

FIG. 5 shows further details of the trade system of FIG. 4. At a central facility 10, one or more processors 20A . . .

20N communicate via a bus 30 with a communications interface 40 including appropriate hardware such as modems, storage 50, such as at least one disk drive, and memory 60, and possibly with others of the processors 20A...20N. The central facility communicates with remote locations through telecommunications links 90A...90D, which may be telephone circuits, radio circuits, data circuits provided by a value added network, or other communications links known to one of ordinary skill in the art. The remote locations may be a third party network 70, a front end 75 such as a personal computer with trade system software, a host 80 configured to interface with the trade system of the present invention, or a terminal 85.

The specific equipment used in the trade system is not critical to the present invention, and one of ordinary skill in the art will readily appreciate variations in equipment configurations that are suitable. The geographic distribution of the equipment comprising the trade system is also not critical to the present invention. Additionally, electronic documents manipulated by the system may comprise only data entered into predefined fields of a template, or the entered data along with predefined field labels forming the template.

When a party communicates with the system, the party must submit the appropriate passwords. For example, logging onto the system may require one password, but only entitle the user to perform certain functions, such as checking status. To perform other functions, such as entering purchase order data, additional passwords or other types of security may be used. Additionally, a public key security system, such as the RSA system, may be employed, in which a party is given a secret code with which to authenticate and/or encode its electronic document submissions to the system and parties wishing to decode the document use a code key for the submitter from a public list. The public key system ensures that an electronic document cannot be forged by someone lacking the secret code.

Generally, a funder guarantees payment for transactions processed by the trade system between an approved buyer and a seller which satisfy the funder's predetermined criteria. The trade system of the present invention verifies that each portion of a transaction properly relates to the purchase order and criteria established by the funder and possibly by the trade system, in a process referred to herein as filtering, and generates payment instructions at appropriate times.

The specific legal arrangements regarding risk of nonpayment which are made by the parties are not critical to the trade system of the present invention.

To obtain access to the system, companies wishing to act as buyers and sellers go through an application process supervised by a funder. Specifically, a funder establishes one or more profiles of acceptable characteristics for a buyer or seller. For example, a funder's profile may specify characteristics such as minimum annual revenue and years in business for a buyer. The funder or its agents then gather information about companies wishing to use the trade system of the present invention, and the funder compares the gathered information with its profile to determine whether a company has acceptable characteristics. If the comparison is satisfactory to the funder, the funder indicates various account parameters thresholds, also referred to herein as criteria, for the company to the trade system.

The funder is responsible for setting credit limits as part of the account parameters. In the simplest case, the credit limit is one amount inclusive of all transactions. In other cases, the funder may set credit limits as a function of other variables, such as nature of goods (e.g., perishable, non-perishable), exposure by party (e.g., a transaction may not exceed 50% of the company's overall trade system credit limit), or exposure by origin or destination country of the goods or services or companies (e.g., all transactions with companies in a particular country may not exceed 80% of the company's overall trade system credit limit). Other account criteria or parameters may be, for example, minimum transaction size, and restriction to a particular type of goods or services.

The trade system administrator may configure the trade system to require additional information regarding a company approved by a funder, and may establish additional criteria (e.g., certain documentary certification required for trade in services). Generally, after a funder has approved account parameters for a company and the trade system has satisfied its application requirements with regard to the company, the company is given access to the trade system in the form of an identification code, sign-on password and appropriate access apparatus. It will be appreciated that access apparatus may include software and a terminal or personal computer.

An accelerated application process is contemplated for companies having electronic access to a third party network, such as an industry network, which is connected to the trade system of the present invention. For example, a funder may elect to establish an immediate approval profile based on information available through a credit rating agency (e.g., Dun and Bradstreet), and authorize the trade system to immediately set certain account parameters for any company having credit rating information satisfying the criteria of its immediate approval profile. Additional information may be subsequently collected for companies obtaining access to the trade system via the accelerated application process.

After obtaining access to the system, a buyer may place orders to purchase goods (in the form of a data input) from one or more sellers through the system. Each purchase order forms an electronic document and includes at least certain terms, such as a description of the goods, price, quantity, and delivery times and arrangement. Appropriate ones of the processors 20A...20N of the trade system compare a buyer's proposed purchase order with the buyer's pre-established account parameters or criteria stored in storage 50 or memory 60 in view of any outstanding activity, such as outstanding purchase orders, which is referred to herein as "filtering" the purchase order. In other words, the system performs a risk evaluation function.

In certain embodiments, a seller may place a tender on the system, that is, advertise goods or services with selected sale terms. The system permits the seller to include both overt and hidden terms in the tender which are stored in storage 50 or memory 60. The system transmits only overt terms of the tender to selected buyers, while withholding the hidden terms. The selected buyers respond by entering offers to purchase. The buyers are selected in one or more of the following ways: the seller places its tender on an electronic bulletin board accessible to all parties having access to the system; the system references a pre-stored list of buyers having certain characteristics, such as their interest in certain goods or services; the seller selects the type of buyers to which its tender should be transmitted; and buyers instruct the system to notify them of seller offers having certain characteristics. The system filters the buyers' responses, that is, compares the buyers' responses with the seller's overt and hidden terms and the criteria established by the buyer's funder for the buyer and/or seller to a transaction. In accordance with the seller's instructions, the trade system either transmits to the seller all buyers' offers which meet the seller's terms and for which funding is guaranteed, or automatically accepts a buyer's offer, e.g., the first buyer offer that meets the seller's terms, or the best price buyer offer received within a predetermined timeframe. As an example of electronic negotiation of a purchase order, the seller may instruct the system to accept the best buyer's offer with respect to a selected term.

Although prospective buyers may be unfamiliar to a seller, the seller is willing to trade with such unfamiliar buyers because their offers include a payment guarantee from a funder.

In certain other embodiments, a buyer may place a tender, that is, an offer to buy, including overt terms, on the system. The buyer's offer may include hidden terms not known to prospective sellers but known to the system. The system transmits the overt terms of the tender to selected sellers, who respond with offers to sell, which are filtered by the trade system against the buyer's overt and hidden terms and the criteria established by the buyer's funder for the buyer and/or seller to a transaction. The sellers are selected in one or more of the following ways: the buyer places its tender on an electronic bulletin board accessible to all parties having access to the system; the system references a pre-stored list of sellers having certain characteristics, such as those willing to supply certain goods or services; the buyer selects the type of sellers to which its tender should be transmitted; and sellers instruct the system to notify them of buyer offers having certain characteristics. In accordance with the buyer's instructions, the system either transmits to the buyer all sellers' offers which meet the buyer's terms and for which funding is guaranteed, or automatically accepts a seller's first or best matching offer. As an example of electronic negotiation of a purchase order, the buyer may instruct the system to accept the best seller's offer with respect to a selected term.

If the purchase order is in accordance with the funder's criteria and any criteria imposed by the trade system, then the trade system can generate a payment guarantee on behalf of the funder when the seller meets certain conditions, such as shipment of the goods by the seller. An advantage of the trade system of the present invention to the funder is that the trade system performs all electronic document checking functions, so the funder is relieved of this burden.

In certain embodiments, the system filters the purchase order data against criteria or predefined parameters for the seller before generating a payment guarantee on behalf of the funder. In the embodiment of FIG. 5, this function is performed by appropriate ones of the processors 20A . . . 20N. A seller parameter may be, for example, manufacturing capacity, or a credit limit such as total pending orders, or pending orders by type of product or country of buyer, or whether in compliance with certified performance standards such as ISO 9000, or the seller's performance history known to the trade system.

When the proposed purchase order meets the filtering criteria, the trade system forwards the purchase order in the form of data to the seller with an indication of the funder's payment guarantee, preferably using an electronic mailbox type facility. In the embodiment of FIG. 5, this function is performed by at least one of the processors 20A . . . 20N using storage 50 or memory 60, communications interface 40, the appropriate telecommunications link 90A . . . 90D, and possibly trade system software operational in, e.g., front end 75.

If the proposed purchase order does not meet the filtering criteria, the buyer may revise its terms, or, in some cases, the buyer may instruct the trade system to forward it to the seller without the funder's payment guarantee and the parties may elect to proceed with the transaction using other non-system avenues for payment guarantees, and using the system as a document manager.

The seller may accept or decline the proposed purchase order or may propose revisions to its terms. That is, the trade system permits electronic negotiation of the terms of the purchase order, and filters the proposed purchase order using at least one of processors 20A . . . 20N at each step of the negotiation to assess compliance with criteria or predetermined parameters stored in storage 50 or memory 60 and to establish an audit trail and to ensure that the parameters of the funder's payment guarantee are met.

After a buyer's proposed purchase order is accepted by a seller, the trade system converts it to an actual or original purchase order, stores it as purchase order data in storage 50 and/or memory 60, updates buyer and seller account data stored in storage 50, notifies the funder and is then ready to filter data representing subsequent actions against the original purchase order data. It will be appreciated that the purchase order may be modified or cancelled in accordance with the wishes of the buyer and/or seller.

Importantly, subsequent activity which relates to the original purchase order is conducted through the system, that is, the system provides data templates for subsequent purchase order fulfillment documents with fields containing data from stored purchase order electronic documents, accepts data templates with additional and/or overriden data, and filters the completed templates, also referred to as draft electronic documents, against the original purchase order, as adjusted for activity to-date, to ensure that compliance with its terms and conditions is maintained. The system permits amendment of the terms of the purchase order. As the purchase order is filled by one or more deliveries or the rendition of services, the trade system adjusts account parameters to reflect the remaining outstanding portion of the purchase order.

The templates may be produced by the processors 20A . . . 20N and transmitted to the remote locations, or may be produced by trade system software operational in the front end 75 or host 80. The trade system places data in appropriate fields of the templates. Such data is stored in storage 50, and may also be located in local storage of the front end 75 or host 80. Filtering of the templates may be distributed across the central facility 10 and the remote locations, or the central facility 10 may be responsible for the entirety of the filtering.

The seller obtains a template for creation of electronic shipping documents for an outstanding purchase order from the system. The seller enters the necessary data in the template to create the shipping documents, e.g., shipping instructions and commercial invoice. The system then filters the shipping documents by means of processors 20A . . . 20N to ensure compliance with the original purchase order and criteria of the funder and/or system and electronically forwards the shipping documents to the freight forwarder or shipper, which in turn selects a carrier.

In some cases, the seller transmits directly to the carrier. If the seller has given shipping instructions to the freight forwarder or carrier outside the system, for example, in a telephone conversation, then the freight forwarder or carrier enters the relevant portions of the shipping instructions to the system for creation of confirming documents, such as the bill of lading.

The seller delivers its goods to the carrier or freight forwarder accompanied by a paper copy of the shipping documents which the seller prepared electronically from a template provided by the system.

The system also delivers the electronic shipping documents to the carrier and permits the carrier to obtain a template for creation of bill(s) of lading with fields filled in as appropriate from stored purchase order data and any subsequent activity. The template, as completed by the carrier, is filtered by processors 20A . . . 20N to ensure compliance with the original purchase order and the shipping documents. Similarly, templates are provided for electronic entry of insurance certification and other confirming documentation. Alternatively, the trading system creates the bill of lading and delivers it to the carrier's electronic mailbox.

The system approves the bill(s) of lading, the carrier confirms shipment by suitable data entry to the system, and other confirming documents are received by the system. Then, the system forwards an electronic copy of appropriate ones of the confirming documents to the seller, the buyer and, if appropriate, the buyer's broker. The system may also respond to special conditions in the purchase order, such as providing printed notification, or advising additional parties such as insurers of certain events.

The carrier then places the goods in transit to the buyer.

The conditions which must be met for payment to occur can vary by transaction. Generally, it is expected that the conditions will include shipment of goods by a shipper, via a carrier, that also has access to the system.

When the appropriate conditions for payment are met, the system automatically issues a funds transfer order. When the funds have been transferred, the system notifies appropriate parties.

If the purchase order calls for payment at the time of shipment, the system transmits data representing a funds transfer request to the funder who maintains a credit relationship with the buyer. The funder then transfers funds on behalf of the buyer to the bank holding the seller's demand deposit account (DDA) using a conventional electronic funds transfer network. Alternatively, the system transmits data notifying the seller's bank, such as the paying bank or the bank holding the seller's DDA, to request payment from the funder. The seller's bank then requests payment from the funder using, for example, a conventional credit card network or a third party electronic document interchange (EDI) network.

It will be appreciated that the bank having the seller's DDA may also advise the seller that funds have been transferred, either through the system of the present invention or through another channel. The bank having the seller's DDA credits the seller's DDA or otherwise makes the funds available to the seller.

After the buyer receives data representing the bill of lading electronic document through the trade system, the buyer has at least two alternatives. The buyer can print the bill of lading document and give it to the buyer's broker, who then presents it to the carrier. Alternatively, the buyer can use the trade system to send the bill of lading electronic document back to the carrier using the trade system. In this case, the trade system verifies the electronic bill of lading from the buyer against the original purchase order and the electronic bill of lading as originally issued by the carrier, and stores data which authorizes the carrier to transfer possession of the goods to the appropriate party, such as the buyer's broker.

The buyer's broker then advises the buyer that goods have arrived and the broker has cleared them through customs. The system provides the capability to create and transmit this message which is an adaptation of the bill of lading. The buyer and its broker thereafter arrange for delivery of goods.

The trade system of the present invention keeps track of outstanding purchase orders, and adjusts the account parameters corresponding to the criteria established by the funder and the trade system for buyers and sellers based on relevant outstanding purchase orders when evaluating new proposed purchase orders.

The present invention reduces the expenses associated with providing a letter of credit, since a buyer or seller is qualified at the time it starts using the system, rather than for each transaction. When standardized purchase order terms are used, transaction costs can be further reduced.

The present invention eliminates the problems caused by inconsistent documents relating to the original purchase order, since the system filters subsequent documents to ensure compliance with the original purchase order and criteria of the funder and/or system while the documents are still in draft electronic form. Moreover, the likelihood that payments will be made in error is reduced since documents are individually associated with a purchase order when they are created, and only certain parties are permitted to create certain documents by the trade system. For example, a buyer may not create a bill of lading.

The present invention eliminates the custodial problems of conventional letters of credit, since the system stores documents electronically for all users.

The present invention is cost-effective for smaller transactions than those financed by conventional letters of credit, so that small and medium-sized companies which have heretofore been deterred from conducting business in certain markets due to financing concerns can now expand their business.

The present invention reduces the risk to the buyer that it will pay for goods that are not received.

Figure 2A:
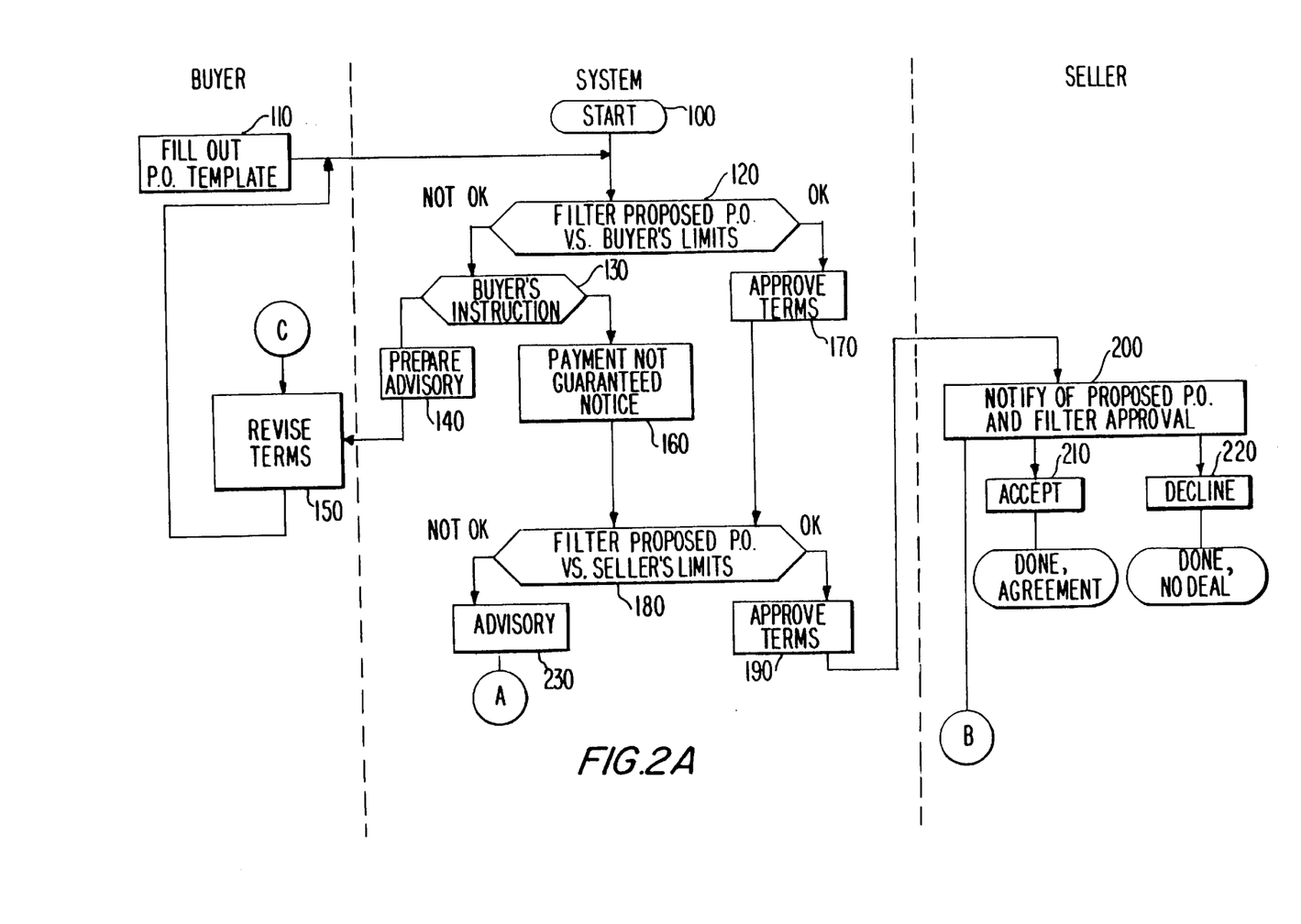
FIGS. 2A–2B are a flowchart showing filtering of a proposed purchase order according to the present invention.
Figure 2B:
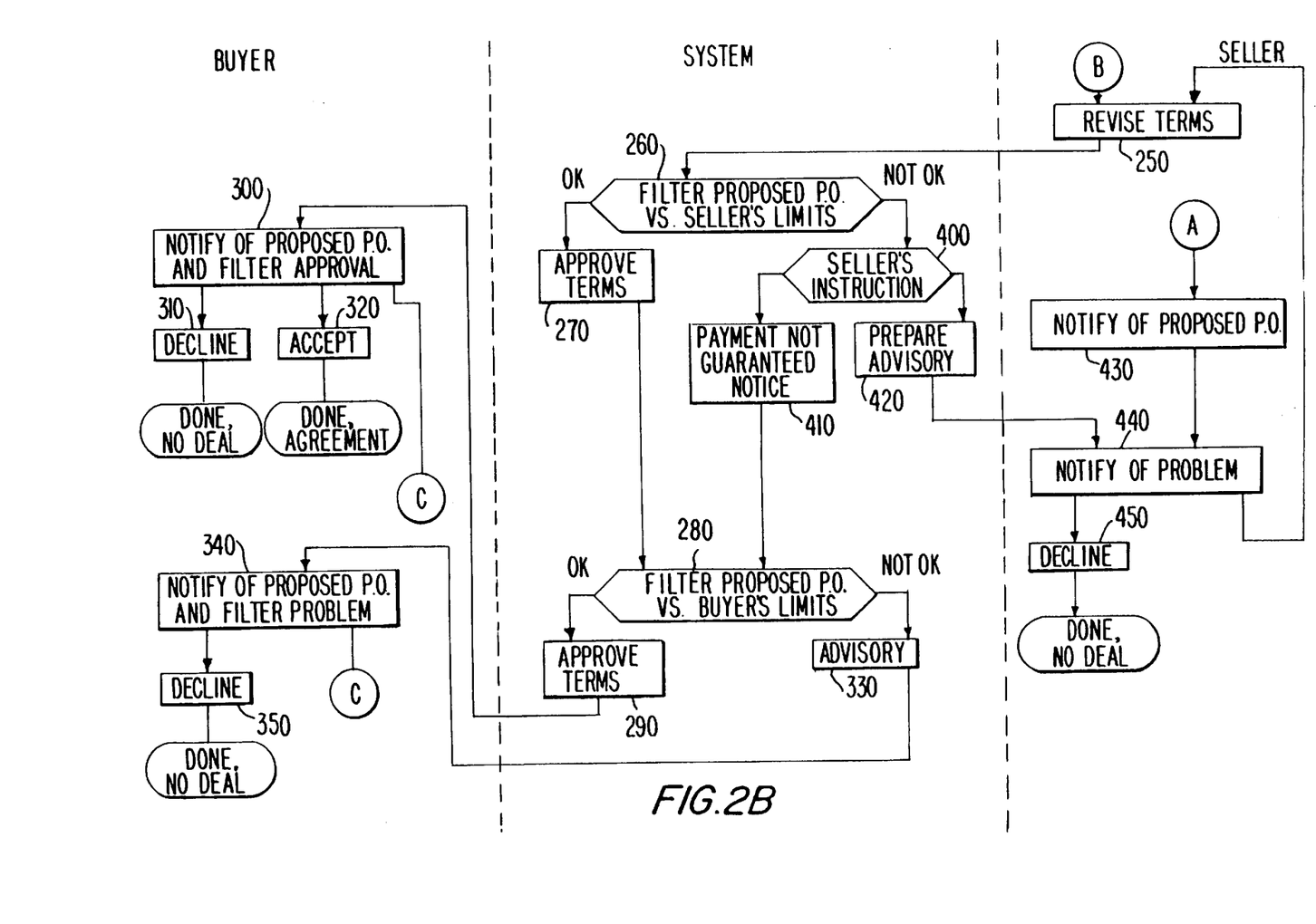

FIGS. 2A–2B are a flowchart showing filtering of a proposed purchase order according to an embodiment of the present invention.

At any time, a buyer can use the trade system to check its account parameters, such as available credit, and the status of outstanding purchase orders. For example, a buyer may access the trade system to obtain an account summary report as follows:

| USER: | | BUYER CO. | DATE: | 3/15/94 |
|---|---|---|---|---|
| CREDIT LIMIT: | | 100,000 | | 11:05 AM EDT |
| AMOUNT DUE: | | 25,000 | PROPOSED: | 30,000 |
| AMOUNT PENDING: | | 10,000 | AVAILABLE: | 65,000 |
| ORDER DATE | AMOUNT | STATUS | ORDER NO. | VENDOR |
| 2/1/94 | 13,000 | SHIPPED | 0201941 | ACME ROCKET |
| 2/10/94 | 12,000 | SHIPPED | 0210941 | SUPERIOR FITTINGS |
| 2/15/94 | 10,000 | PENDING | 0215941 | CONSOLIDATED LINT |
| 3/1/94 | 30,000 | PROPOSED | 030194P | BIALYSTOCK & BLOOM |

After reviewing this report, which may comprise examining certain purchase orders in detail, the buyer realizes that if Bialystock & Bloom accepts the proposed purchase order, the available credit will become $35,000. Similarly, when Consolidated Lint ships the goods, the buyer's pending credit amount will decrease by $10,000. A detailed examination of the Bialystock & Bloom purchase order might indicate that it has been retrieved from the Bialystock & Bloom electronic mailbox, but a response has not yet been entered. A detailed examination of the Consolidated Lint purchase order might indicate a shipment schedule of Mar. 16, 1994 and Mar. 20, 1994.

In this example, it is assumed that the buyer, located in the U.S., has become aware of the availability of tee shirts from Mexiteeco located in Mexico. The buyer queries the trade system to determine whether Mexiteeco has access thereto. The trade system responds affirmatively, and provides a brief report on Mexiteeco. The report lists, for example, the address of Mexiteeco, a summary of Mexiteeco's business, and any offers to sell which Mexiteeco has submitted to the trade system. The buyer decides to place an order through the trade system, and requests that the system transmit a purchase order template.

The trade system transmits a purchase order template having data entry fields to the buyer. In certain embodiments, front end software installed at the buyer's premises merges data supplied from the trade system central facility to display a partially completed template to the buyer. Additionally, if the seller's offer is available in a known electronic format, such as American National Standards Institute (ANSI) Electronic Data Interchange Accredited Standards Committee (ASC) X12 Standard, the trade system may extract pertinent portions of the seller's offer and place them in the appropriate fields of the template.

For example, the data inserted in the template may include the following information prepared by the trade system: buyer's name, buyer's address, buyer's internal order number, order date. If the buyer selects Mexiteeco's tee shirt offer by an appropriate data entry to the system, then the template may include the seller's name (Mexiteeco), the seller's address, the price per unit, currency conversion rate, and any additional charges which Mexiteeco has identified to the trade system. It is expected that certain portions of the buyer identification information cannot be changed by the buyer, such as system identification codes, and that other portions of the buyer identification information can be specified by the buyer, or the buyer may override the information supplied by the system.

The buyer enters appropriate additional information to the fields of the prepared template, such as quantity, design, color and size, and submits the completed template to the system as a proposed purchase order (step 110). It will be appreciated that not all fields of the template need to be completed for each purchase order, and that some fields will be completed in due course, such as delivery schedule, shipping terms, payment terms, insurance terms, and possibly penalties for delayed performance. Some purchase orders may rely on a free-form field to specify additional information. The front end software at the buyer's premises may perform preliminary consistency checks on the data entered into the template, for example, ensuring that the quantities to be delivered according to a proposed delivery schedule, if one is supplied, equal the quantity ordered.

The system receives the proposed purchase order data and filters it against the buyer's account parameters (step 120). In certain embodiments, filtering comprises searching fields of the template for certain text, comparing data entered into a field of the template with one or more account parameters or criteria, comparing data from multiple fields with account parameters and so forth.

For example, the buyer may have a limit of X dollars for orders from country S, after outstanding purchase orders are considered. The buyer may also have a limit of Y dollars for orders in goods of type G, after outstanding purchase orders are considered. For a proposed purchase order having a value of Z for goods of type G from country S, the filtering includes comparing Z with X and comparing Z with Y. If $Z<Y$ and $Z<X$, then this purchase order is, so far, eligible for system approval. For example, a transaction involving $40,000 of goods from a manufacturer in Mexico may be rejected for a buyer having a limit of $35,000 (e.g., 35% of a credit limit of $100,000) for goods from a Mexican manufacturer.

Other fields may be filtered differently, for example, the delivery schedule may be simply compared against the present date to ensure that the delivery dates are future dates. Furthermore, the system checks one or more sets of fields simply to ensure that information is present. In certain embodiments, some of this processing may occur in front end software at the buyer's location.

Another example of filtering is for the trade system to check the type of goods, such as tee shirts, against a funder's list of goods for which funded transactions are allowed.

A further example of filtering is for the trade system to check the data in an electronic bill of lading submitted by a buyer against the data in an electronic bill of lading created by a carrier, to determine whether changes have been made, and also to check the buyer's bill of lading against the original purchase order to ensure that the terms of the original purchase order are followed.

If the proposed purchase order does not satisfy the buyer's account criteria, then the system determines how the buyer wishes this situation to be handled (step 130), for example, by consulting a field of the proposed purchase order. For example, if Bialystock & Bloom has accepted the buyer's outstanding proposed purchase order for a price of 30,000 while the buyer was preparing the Mexiteeco purchase order for a price of 40,000, then the Mexiteeco purchase order will be rejected by the trade system due to inadequate available credit for the buyer.

If the buyer has indicated that a proposed purchase order should not be transmitted to the seller unless a payment guarantee can be authorized by the system on behalf of a funder, then the system prepares a notice advising the buyer as to why it would not authorize a payment guarantee (step 140), and transmits this advisory to the buyer, preferably using an electronic mail type facility. The advisory notice may suggest changes which would make the purchase order acceptable. The buyer can then revise the terms of the proposed purchase order (step 150) and submit the revised version in the form of data entry to the system as a proposed purchase order for filtering by the system (step 120). For example, the buyer may reduce the amount of the proposed purchase order to Mexiteeco to 35,000.

If the buyer wishes to use the system as an electronic document manager, and not as a payment guarantor, then the buyer will have appropriately indicated its preference, such as in the purchase order template, and the system will then append data representing a "payment not guaranteed" notice to the proposed purchase order data (step 160). The proposed purchase order data is filtered against the seller's predetermined criteria (step 180), and transmitted to the seller in the manner described below with reference to steps 190 or 230.

If the proposed purchase order satisfies the buyer's predetermined criteria, the system approves its terms, meaning that this purchase order is eligible for a payment guarantee by the system to the seller (step 170).

In certain embodiments, filtering of the proposed purchase order data with respect to the seller's criteria occurs before filtering of the proposed purchase order data with respect to the buyer's criteria.

Next, the system filters the proposed purchase order against the seller's predetermined criteria in a manner similar to that used for filtering against the buyer's predetermined criteria (step 180).

If the proposed purchase order satisfies the seller's predetermined criteria, the system approves its terms and transmits a payment guarantee on behalf of the funder to the seller (step 190).

The system then transmits data representing the proposed purchase order and its payment guarantee information to the seller (step 200), transmits data notifying the buyer that this information has been delivered to the seller and updates the account information for the buyer and seller. It will be appreciated that the trade system stores the proposed purchase order and otherwise updates appropriate internal files. For example, the buyer's account information would now include a proposed purchase order to Mexiteeco. It is preferred that the proposed purchase order be delivered as an electronic mail type message to the seller, that is, the seller does not have to be interacting with the system at the same time as the buyer. When the seller reviews the electronic mail message including the proposed purchase order, this event is detected, for example, by the seller's terminal that, in turn, transmits data indicating the same to the trade system. The trade system then notifies the buyer of this event by a data message, or else simply updates a status field of the stored proposed purchase order and waits for the buyer to submit a status inquiry for the purchase order.

In an alternative embodiment, after step 190, the trade system transmits a data message to the buyer that the purchase order can be processed through the trade system. In this case, if the buyer wishes to proceed with the purchase order, the buyer must append an electronic signature or other authorization code to the approved purchase order and submit the "signed" purchase order to the system. It will be appreciated that, in this case, the proposed purchase order is substantially a hypothetical, "what if" query to the trade system, and that the electronic signature converts it into an actual transaction having a status of a proposed order.

As another alternative, an explicit "draft" mode is provided, in which the trade system filters the buyer's proposed purchase order data, gives draft mode authorization, permits the buyer to send the draft proposed purchase order data to the seller, and allows the seller to indicate a draft mode acceptance by a return transmission, and returns the draft purchase order and acceptance to the buyer. At this point, the buyer may resubmit the proposed purchase order data in non-draft or actual mode.

In response to a proposed purchase order, the seller may accept, decline or revise the terms of the proposed purchase order and transmit the revised purchase order data to the buyer as a new proposed purchase offer, that is, an offer to receive an offer with the revised terms. For example, the seller might change proposed purchase offer data that includes credit extension by the seller to revised purchase offer data that requires immediate payment by the buyer upon shipment of goods or submission of documentary evidence of performance of services.

If the seller accepts (step 210), meaning that the seller enters an appropriate data message to the system in response to the proposed purchase order data, then a contract is formed and the system converts the proposed purchase order data to outstanding purchase order data. An acceptance method for the seller may be to append an electronic signature or other authorization code to the proposed purchase order data, and submit it to the trade system. At this time, the system automatically takes other actions, such as transmitting an appropriate data message to the funder responsible for the payment guarantee of the outstanding purchase order, delivering an electronic mail acceptance notice to the buyer and updating account data for the buyer and seller.

If the seller wishes to accept and also to advise the buyer of a modification which is acceptable to the seller and may be of interest to the buyer, the seller may do this using the system as an electronic mail facility. For example, if the seller has transmitted a data message to accept an order for 9,000 tee shirts at $10.00 each, the seller may separately transmit a message to the buyer that it can order 10,000 tee shirts at $9.01 each. The buyer can then amend its outstanding purchase order. The amending process is similar to the process used to establish the purchase order.

If the seller declines (step 220), meaning that the seller enters an appropriate message to the system in response to the proposed purchase order transmission, then the system notifies the buyer of this event, and appropriately disposes of the proposed purchase order, such as by placing it into a temporary storage file and automatically deleting it after a predetermined time.

If the seller wishes to revise the terms of the proposed purchase order, the seller may do so and then enters data to the system representing a revised version of the order (step 250).

If the buyer's proposed purchase order fails to satisfy the seller's account criteria (e.g., the seller lacks adequate manufacturing capacity to fill the order), then the trade system prepares an advisory message (step 230) and delivers this advisory message to the buyer. Alternatively, the system delivers the proposed purchase order to the seller (step 430) along with the advisory message explaining why, due to the seller's situation, the system could not authorize a payment guarantee by the funder for the buyer (step 440). The system may also indicate whether it can authorize a payment guarantee based on the buyer's situation (based on step 170) or whether it will not authorize a payment guarantee based on the buyer's situation (based on step 160). The seller can respond by declining to proceed with the transaction (step 450) in which case the system takes the same actions as at step 220. Alternatively, the seller can revise the terms of the proposed purchase order and submit the revised version to the system (step 250).

After the seller has submitted a revised purchase order, the system filters the revised version against the seller's account parameters (step 260).

If the revised purchase order fails to satisfy the seller's account criteria, then the system determines how the seller wishes this situation to be handled (step 400), in a similar manner as used for determining the buyer's preference at step 130, and either appends data representing a "payment not guaranteed" notice to the revised purchase order data (step 410) or prepares a notice advising the seller as to why it would not authorize a payment guarantee, and delivers this advisory to the seller (step 440).

If the revised purchase order satisfies the seller's account criteria, the system approves its terms, meaning that the system can authorize a payment guarantee for this purchase order (step 270). The system filters the proposed purchase order data against the buyer's account criteria or parameters (step 280).

If the revised purchase order satisfies the buyer's account criteria, the system approves its terms, meaning that it can authorize a payment guarantee (step 290). The system transmits the revised purchase order data and payment guarantee data information to the buyer (step 300). In response to a revised purchase order, the buyer may accept (step 320), decline (step 310) or revise the terms of the revised purchase order (step 150) and transmit a corresponding message through the system to the seller as a new proposed purchase offer, with filtering as discussed above.

If the revised purchase order data fails to satisfy the buyer's account criteria, then the system prepares an advisory message (step 330). The system delivers the revised purchase order to the buyer along with the advisory message explaining why, due to the buyer's situation, the system could not authorize a payment guarantee (step 340). It will be appreciated that the system may also transmit an indication as to whether or not it can authorize a payment guarantee based on the seller's situation (from steps 270 and 410). The buyer can respond by declining to proceed with the transaction (step 350) or by revising the terms of the revised purchase order to form a new proposed purchase order (step 150).

Figure 3A:
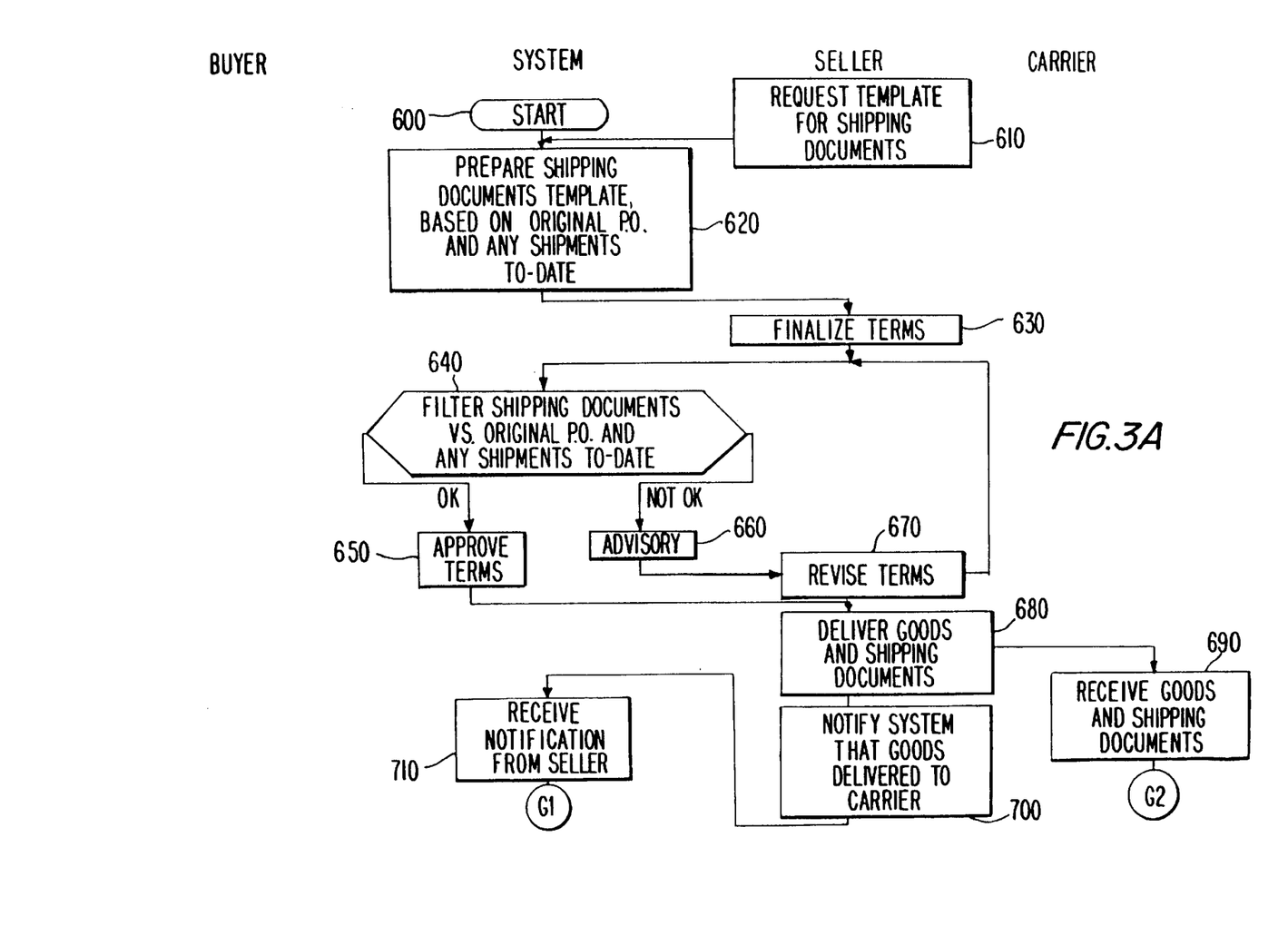
FIGS. 3A–3C are a flowchart showing filtering of a shipping document and automatic payment according to the present invention.
Figure 3B:
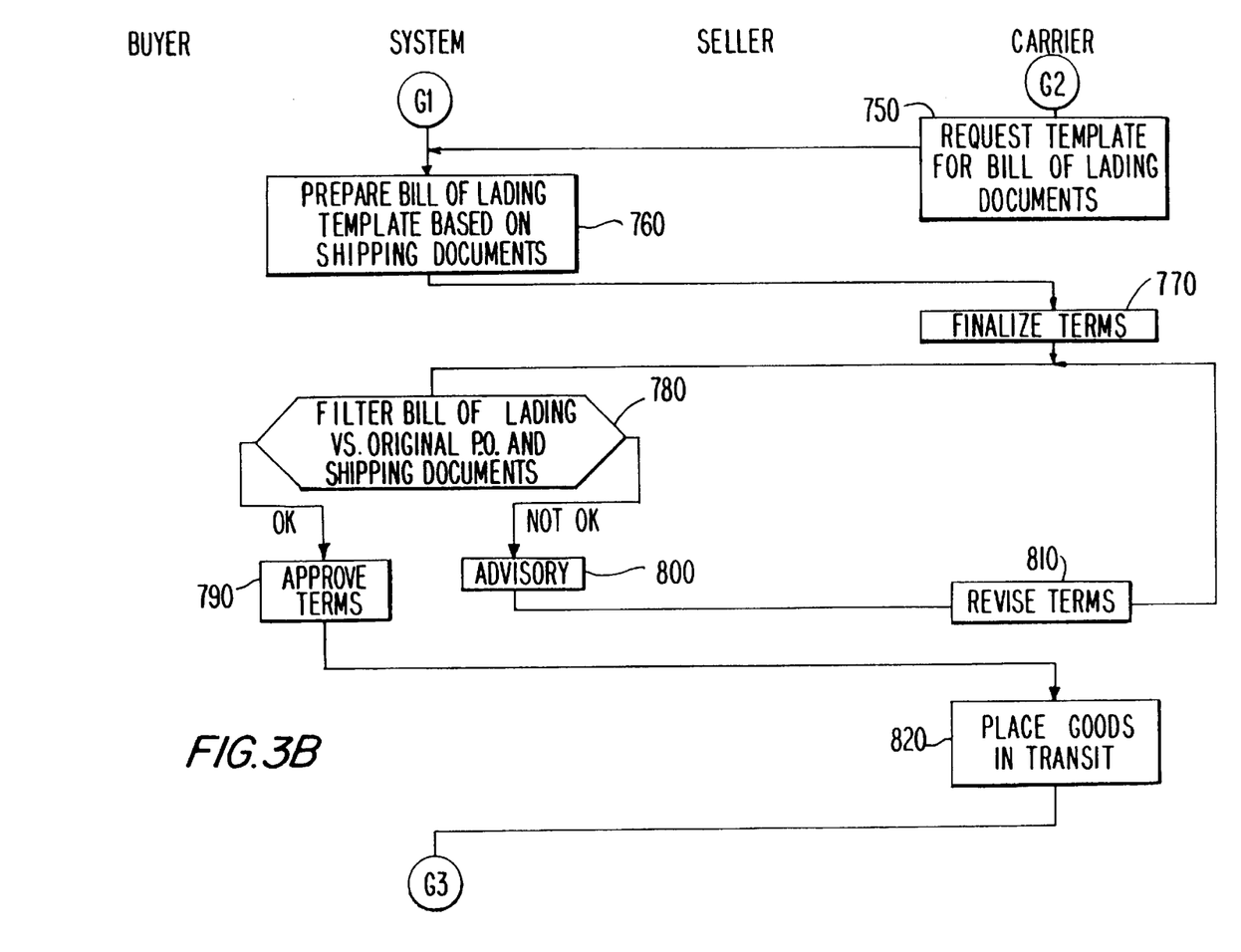
Figure 3C:
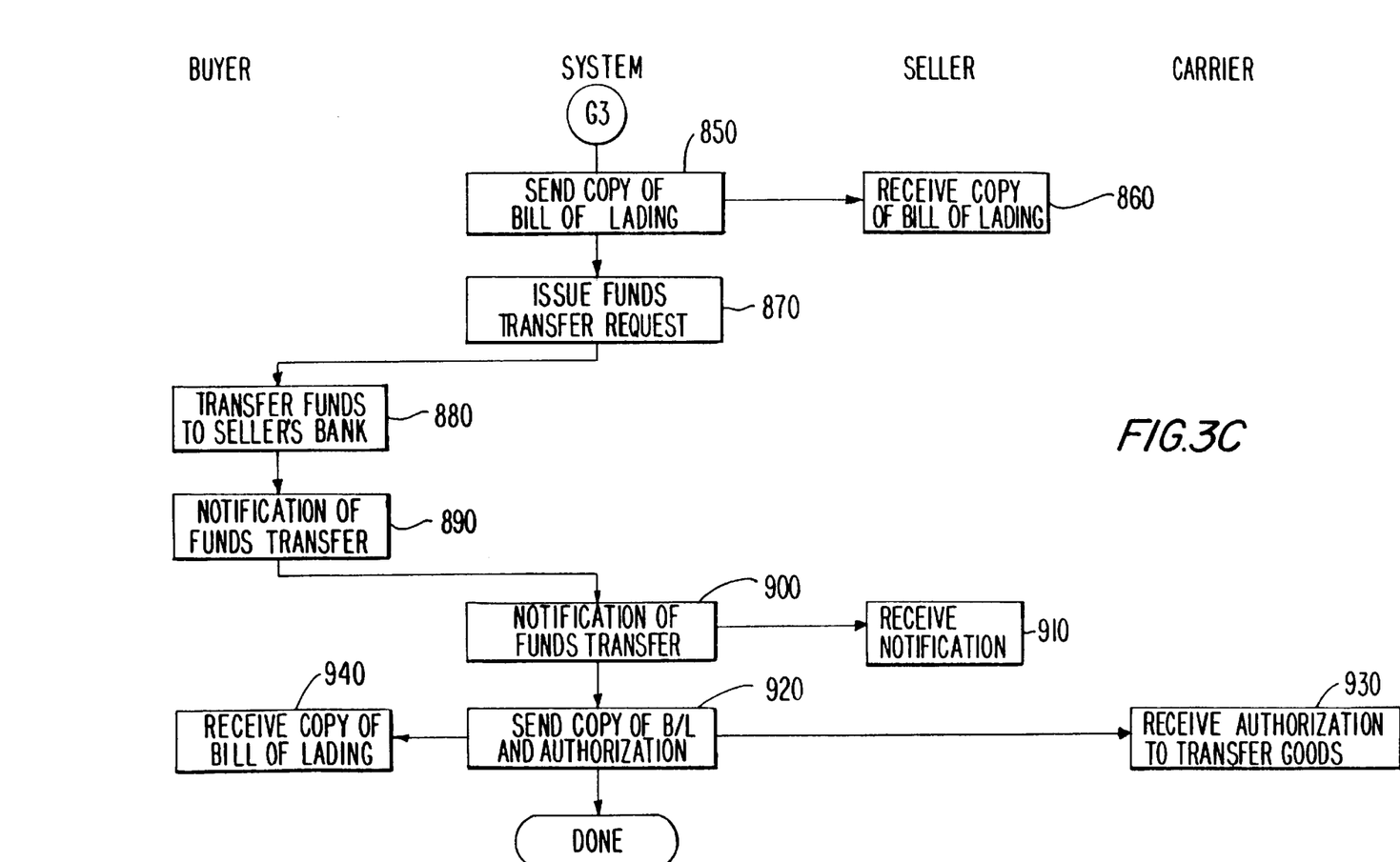

FIGS. 3A–3C are a flowchart showing filtering of a shipping document and automatic payment according to the present invention.

After a proposed purchase order has been converted into an outstanding purchase order and before the order has been entirely fulfilled, the seller may request a template for shipping documents relating to this outstanding purchase order from the system (step 610).

In response to the seller's request, the system prepares a shipping document template based on the outstanding purchase order which reflects the original purchase order and any shipments to date (step 620). An important feature of the present invention is that, in this and other documents, the goods or services are described exactly as in the original purchase order. The system reflects pertinent conditions of the original purchase order in the appropriate fields of the shipping template. For example, if the shipment must be in a particular type of container, this information is provided in the appropriate portion of the shipping documents template. One technique for accomplishing this function is to indicate, for each of the fields in the original purchase order, which subsequent documents the information is relevant to. The indication can be provided by the user, by an analysis function built into the system, or by a combination thereof.

The seller then enters data into additional fields of the shipping template, and possibly overrides system supplied information in some fields, then submits the template and its data to the system as a proposed shipping document (step 630). For example, the seller may wish to make only a partial shipment, so the seller overrides the system-supplied parameter in the quantity field, which typically is the remainder of the goods to be shipped. The system compares the proposed shipping document against the original purchase order and any shipments to date (step 640). If there is a problem, such as a mismatched term, the system prepares an advisory message and transmits it to the seller (step 660), who can revise the terms of the proposed shipping document and reenter the document data in the system (step 670).

When the system determines that the proposed shipping document is acceptable, it converts it into active shipping document data (step 650), and transmits the shipping document data to the carrier or freight forwarder selected by the seller. The system may also deliver a copy of the shipping document to other parties, such as an insurer. The system transmits a message to the seller that the shipping document has been delivered to the carrier. If the buyer wishes to examine the status of this order, the buyer may access the shipping document data for review.

The carrier or freight forwarder may communicate with the trade system through a third party electronic network. In this case, the trade system prepares messages in an appropriate standardized format such as ANSI X12 or Edifact and delivers its prepared messages to a network gateway. However, the trade system continues to associate messages and electronic documents with the original purchase order, independent of the telecommunications path utilized for delivery of such messages.

Many arrangements for shipping goods are possible, and many arrangements for assuring delivery of services are also possible. In each case, the trade system functions to manage the associated electronic documents, to filter these documents against the appropriate ones of the other documents previously associated with the original purchase order, and to notify appropriate parties when data are inconsistent and when events have occurred.

The seller then delivers the goods and a printed copy of the shipping document to the freight forwarder or the carrier (step 680). The seller enters data in the system to provide notification that it has transferred possession of the goods to the freight forwarder or the carrier (steps 700, 710). The carrier also may notify the system that the goods have been received from the seller (step 690).

After the goods have been delivered to the carrier, the carrier may request a template for the bill of lading and possibly a template for the packing list (step 750). The system prepares templates for the bill of lading and packing list based on the shipping document and other relevant documents which may include the outstanding purchase order (step 760).

The carrier finalizes the terms of the bill of lading template and the packing list template and submits them to the system (step 770). The system filters the finalized bill of lading and packing list against the shipping document and other relevant documents, which may include the outstanding purchase order (step 780). If the system detects a problem through filtering, the system prepares an advisory message for the carrier (step 800) and the carrier revises the data entered in the template and submits the revised template to the system (step 810). If filtering by the trade system determines that the entered data is consistent with the terms of the original purchase order, as adjusted for activity to-date, it converts the bill of lading template into an electronic bill of lading document, and delivers a copy to the carrier who places the goods in transit (step 820). The system also delivers a copy of the bill of lading to the seller (steps 850, 860).

Alternatively, the carrier prepares the bill of lading before receipt of the goods from the seller, in a similar manner as described above. If appropriate, the carrier may utilize a freight invoice or other electronic document. Also, an electronic signature or other authorization code may be required from the carrier before the system accepts the bill of lading as related to the original purchase order.

The system retains and stores copies of all electronic documents which it processes, that is, all documents for which it provided a template and/or performed filtering. The system also stores copies of all documents related to a purchase, such as electronic mail messages referencing the purchase order or its subsequent related documents. If requested, the trade system may generate paper documents corresponding to the electronic documents which it has stored.

In the example of FIGS. 3A and 3B, payment is due upon shipment. The system detects that the conditions for payment have been fulfilled (step 790), and transmits a message to the funder that payment to the seller is required. Payment may be made in one of several manners. For example, the trade system may issue a funds transfer request to the bank holding the buyer's or funder's DDA (step 870), which transfers the funds to the bank holding the seller's DDA (step 880) and notifies the system that the funds have been transferred (step 890).

The system receives the notification of funds transfer (step 900) and passes it to the seller (step 910). Then the system transmits the data constituting the bill of lading to the buyer (step 920), and authorizes the carrier to transfer possession of the goods to the buyer (step 930). The buyer receives the bill of lading data (step 940) and makes arrangements with the carrier to receive the goods. For example, the buyer may instruct the trade system to send a copy of the bill of lading to a customs agent who obtains the goods on behalf of the buyer. It is preferred that each of the buyer and the carrier notify the system that the buyer has received the goods. When the buyer has accepted the goods, which may be, for example, by lapse of time or by explicit notification to the system, the purchase order records are updated by the system to reflect fulfillment of an appropriate portion of the purchase order.

An example of an alternate payment mechanism is a situation in which, after the carrier has submitted a bill of lading or freight invoice to the trade system which has transmitted this document to the seller, the seller produces data representing an invoice and transmits it to the buyer. The trade system may also forward a copy to the funder. The buyer responds by creating a payment advice document, which advises the seller of the payment date and instructs a financial institution to transfer payment to the seller.

In another payment arrangement, the trade system transmits an instruction to the seller's bank to request payment, and in turn, the seller's bank requests payment from the funder using the trade system. The instruction to request payment is also referred to as a payment instruction.

The trade system may utilize data representing outside information in processing electronic documents. For example, an embargo from one country to another may cause the system to automatically notify a carrier to hold a shipment, or may cause the system to reject shipping documents relating to the embargoed country.

In certain embodiments, the trade system automatically generates scheduling reminder data. For example, if a seller is required to ship goods by a particular date, the trade system may generate an appropriate electronic mail reminder and transmit it to the buyer and to the seller.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of facilitating trade in goods and/or services, comprising the steps of:
   storing, in a data processing system, offer data representing an offer to trade goods or services including overt and hidden terms;
   transmitting, by means of the data processing system, overt terms data representing the overt terms of the offer to trade to at least one party;
   inputting in the data processing system response data representing a response from the at least one party to the transmitted overt terms data; and
   comparing, by means of the data processing system, the response data with the offer data representing the overt and hidden terms of the offer to produce term compliance data indicating whether the response data are in compliance with the overt and hidden terms of the offer;
   storing data indicative of the establishing a contract for said goods and/or services based on the term compliance data; and
   producing payment guaranty data in the data processing system in response to the term compliance data, the payment guaranty data representing a payment guaranty to the seller for payment under the contract.

2. The method of claim 1, further comprising the steps of storing, in the data processing system, criteria data representing criteria by which a funder's commitment to finance a trade transaction may be determined; and
   determining, by means of the data processing system, whether the response data complies with the stored criteria data to produce criteria compliance data indicating whether the trade transaction defined by the offer data and response data complies with the funder's criteria.

3. The method of claim 2, further comprising the step of producing, by means of the data processing system, payment guarantee data representing a payment guarantee on behalf of the funder when the criteria compliance data indicate that the trade transaction defined by the offer data and response data is in compliance with the stored criteria data and the term compliance data indicate that the response data are in compliance with the overt and hidden terms of the offer.

4. A system for facilitating trade in goods and/or services, comprising:
   means for storing offer data representing an offer to trade goods or services including overt and hidden terms;
   means for transmitting overt terms data representing the overt terms of the offer to trade to at least one party;
   means for inputting response data representing a response from the at least one party to the transmitted overt terms data; and means for comparing the response data with the offer data representing the overt and hidden terms of the offer to produce term compliance data indicating whether the response data are in compliance with the overt and hidden terms of the offer;
   means for storing data indicative of establishing a contract for said goods and/or services based on the term compliance data; and
   means for producing payment guaranty data in response to the term compliance data, the payment guaranty data representing a payment guaranty to the seller for payment under the contract.

5. The system of claim 4, wherein said means for storing is operative to store criteria data representing criteria by which a funder's commitment to finance a trade transaction may be determined; and said means for comparing is operative to compare the response data with the stored criteria data to produce criteria compliance data indicating whether the trade transaction defined by the offer data and response data complies with the funder's criteria.

6. The system of claim 5, further comprising means for producing payment guarantee data representing a payment guarantee on behalf of the funder when the criteria compliance data indicate that the trade transaction defined by the offer data and the response data is in compliance with the stored criteria data and the term compliance data indicate that the response data are in compliance with the overt and hidden terms of the offer.

7. A digital computer for facilitating trade in goods and/or services, comprising:

- memory means for storing offer data representing an offer to trade goods or services including overt and hidden terms;
- means for transmitting overt terms data representing the overt terms of the offer to trade to at least one party;
- an input for inputting response data representing a response from the at least one party to the transmitted overt terms data; and
- processing means for comparing the response data with the offer data representing the overt and hidden terms of the offer to produce compliance data indicating whether the response data are in compliance with the overt and hidden terms of the offer;
- means for storing data indicative of establishing a contract for said goods and/or services based on the term compliance data; and
- means for producing payment guaranty data in response to the term compliance data, the payment guaranty data representing a payment guaranty to the seller for payment under the contract.

8. A method of facilitating trade in goods, said method comprising:

- receiving, at a financing institution-accessible facility, payment-due data representing a seller's fulfillment of a sale-of-goods transaction between the seller and a buyer, the payment-due data reflecting a result of automatically comparing delivery data with delivery obligation data representing a delivery obligation of the seller in accordance with the sale-of-goods transaction; and
- transmitting, responsive to said received payment-due data, to a recipient data representing a payment due to the seller.

* * * * *